United States Patent
Wang et al.

(10) Patent No.: US 8,264,439 B2
(45) Date of Patent: *Sep. 11, 2012

(54) LIQUID CRYSTAL DISPLAY PANEL AND LIQUID CRYSTAL DISPLAY DEVICE USING THE SAME

(75) Inventors: I-Fang Wang, Changhua County (TW); Hen-Ta Kang, Taichung (TW)

(73) Assignee: Wintek Corporation, Taichung (TW)

( * ) Notice: Subject to any disclaimer, the term of this patent is extended or adjusted under 35 U.S.C. 154(b) by 856 days.

This patent is subject to a terminal disclaimer.

(21) Appl. No.: 12/258,667

(22) Filed: Oct. 27, 2008

(65) Prior Publication Data
US 2009/0115923 A1    May 7, 2009

(30) Foreign Application Priority Data

Nov. 1, 2007  (TW) ................................ 96141208 A
Dec. 6, 2007  (CN) ........................... 2007 1 0196762

(51) Int. Cl.
*G09G 3/30* (2006.01)
*G02F 1/1343* (2006.01)
*G02F 1/1335* (2006.01)

(52) U.S. Cl. ............ 345/90; 345/93; 345/102; 349/141; 349/144

(58) Field of Classification Search ............... 345/41–43, 345/48, 50–51, 54–55, 58, 67, 79, 80, 87–90, 345/92–93, 96, 98, 205–206, 209, 214, 690, 345/694, 76, 102; 349/141, 144
See application file for complete search history.

(56) References Cited

U.S. PATENT DOCUMENTS

| | | | |
|---|---|---|---|
| 6,924,863 B2* | 8/2005 | Nishida et al. | 349/141 |
| 7,663,708 B2* | 2/2010 | Wang et al. | 349/37 |
| 7,755,710 B2* | 7/2010 | Wang et al. | 349/48 |
| 7,839,377 B2* | 11/2010 | Jang | 345/102 |
| 7,843,520 B2* | 11/2010 | Lu et al. | 349/38 |
| 7,880,849 B2* | 2/2011 | Kim et al. | 349/144 |
| 2006/0007072 A1* | 1/2006 | Choi et al. | 345/76 |
| 2006/0132683 A1* | 6/2006 | Yun et al. | 349/114 |
| 2007/0229430 A1 | 10/2007 | Wang et al. | |
| 2007/0236640 A1* | 10/2007 | Kimura | 349/141 |

OTHER PUBLICATIONS

Taiwanese language office action dated Sep. 21, 2011.

* cited by examiner

*Primary Examiner* — Quan-Zhen Wang
*Assistant Examiner* — Michael J Eurice
(74) *Attorney, Agent, or Firm* — Thomas|Kayden

(57) ABSTRACT

A LCD panel includes a data line, first and second scan lines, first and second pixels and an auxiliary electrode. The first pixel has a first pixel electrode, first and second switches. The first switch has an input terminal coupled to the data line, a control terminal coupled to the first scan line and an output terminal coupled to the first pixel electrode. The second switch has an input terminal coupled to the data line and a control terminal coupled to the first scan line. The second pixel has a second pixel electrode and a third switch. The third switch has an input terminal coupled to the data line, a control terminal coupled to the second scan line and an output terminal coupled to the second pixel electrode. The auxiliary electrode coupled to an output terminal of the second switch is adjacent to the second pixel electrode.

32 Claims, 10 Drawing Sheets

LIQUID CRYSTAL DISPLAY PANEL AND LIQUID CRYSTAL DISPLAY DEVICE USING THE SAME

This application claims the benefit of Taiwan application Serial No. 96141208, filed Nov. 1, 2007, the subject matter of which is incorporated herein by reference.

BACKGROUND OF THE INVENTION

1. Field of the Invention

The invention relates in general to a liquid crystal display panel and a liquid crystal display device using the same, and more particularly to a liquid crystal display panel capable of reducing pixel voltage shift and a liquid crystal display device using the same.

2. Description of the Related Art

Liquid crystal display (LCD) with a wide viewing angle mainly makes use of protrusions (or bumps) formed on its substrates or slits on its electrodes to pre-tilt liquid crystal (LC) cells. Nowadays, technology of forming protrusions or slits to generate multi-domain effect for displaying image has been widely used in the products of LCD.

Although protrusions on the electrodes enable LCD to have multi-domain effect, they have bevel edges after manufactured. The bevel edges give the LC cells boundary energy so that the LC cells are not vertical to the substrates when the supplied pixel voltage for driving the LC cells is zero. Due to the tilt of the LC cells as the pixel voltage is not provided, light would pass through the LCD, causing the problem of light leak to LCD.

Forming slits on the electrodes could merely generate limited effect of multi-domain since it relates to the alignment of the substrates, the width of single slit and the distance between two slits. In addition, disclination happens to the LC cells above slits and between any two of the slits, reducing the transparent rate of LCD.

At present, technology of using auxiliary electrodes and pixel electrodes to control the LC cells has also been used in the product of LCD. In each pixel, an auxiliary electrode is disposed around the pixel electrode for aligning the LC cells. Moreover, the auxiliary electrode in one pixel is extended from the pixel electrode of another adjoining pixel, and a coupling capacitance is formed between the auxiliary electrode and the pixel electrode of the same pixel. Therefore, when the pixel voltage of one pixel is changed, the pixel voltage of its adjoining pixel is changed accordingly due to the effect of the coupling capacitance, causing the problem of pixel voltage shift to the adjoining pixel, further deteriorating the display image quality.

SUMMARY OF THE INVENTION

It is therefore an object of the invention to provide a liquid crystal display (LCD) panel and a LCD device using the same. The auxiliary electrode for aligning liquid crystal cells in one pixel receives the pixel voltage of an adjoining pixel via a switch, solving the problem of pixel voltage shift in the adjoining pixel due to the coupling capacitance, further effectively enhancing the image quality.

The invention achieves the above-identified object by providing a LCD panel. The LCD panel includes a data line, a first scan line, a second scan line, a first pixel, a second pixel and an auxiliary electrode. The first pixel has a first pixel electrode, a first switch and a second switch. The first switch has a first input terminal, a first control terminal and a first output terminal, wherein the first input terminal is coupled to the data line, the first control terminal is coupled to the first scan line and the first output terminal is coupled to the first pixel electrode. The second switch has a second input terminal, a second control terminal and a second output terminal, wherein the second input terminal is coupled to the data line, and the second control terminal is coupled to the first scan line. The second pixel has a second pixel electrode and a third switch. The third switch has a third input terminal, a third control terminal and a third output terminal, wherein the third input terminal is coupled to the data line, the third control terminal is coupled to the second scan line and the third output terminal is coupled to the second pixel electrode. The auxiliary electrode is coupled to the second output terminal of the second switch and adjacent to the second pixel electrode.

The invention achieves the above-identified object by providing a LCD panel. The LCD panel includes a scan line, a first data line, a second data line, a first pixel, a second pixel and an auxiliary electrode. The first pixel has a first pixel electrode, a first switch and a second switch. The first switch has a first input terminal, a first control terminal and a first output terminal, wherein the first input terminal is coupled to the first data line, the first control terminal is coupled to the scan line and the first output terminal is coupled to the first pixel electrode. The second switch has a second input terminal, a second control terminal and a second output terminal, wherein the second input terminal is coupled to the first data line and the second control terminal is coupled to the scan line. The second pixel includes a second pixel electrode and a third switch. The third switch has a third input terminal, a third control terminal and a third output terminal, wherein the third input terminal is coupled to the second data line, the third control terminal is coupled to the scan line and the third output terminal is coupled to the second pixel electrode. The auxiliary electrode is coupled to the second output terminal of the second switch and adjacent to the second pixel electrode.

The invention achieves the above-identified object by providing a LCD device. The LCD device includes a data driver, a scan driver and a LCD panel. The LCD panel includes a data line, a first scan line, a second scan line, a first pixel, a second pixel and an auxiliary electrode. The data line is coupled to the data driver, and the first and second scan lines are coupled to the scan drivers. The first pixel has a first pixel electrode, a first switch and a second switch. The first switch has a first input terminal, a first control terminal and a first output terminal, wherein the first input terminal is coupled to the data line, the first control terminal is coupled to the first scan line and the first output terminal is coupled to the first pixel electrode. The second switch has a second input terminal, a second control terminal and a second output terminal, wherein the second input terminal is coupled to the data line, and the second control terminal is coupled to the first scan line. The second pixel has a second pixel electrode and a third switch. The third switch has a third input terminal, a third control terminal and a third output terminal, wherein the third input terminal is coupled to the data line, the third control terminal is coupled to the second scan line and the third output terminal is coupled to the second pixel electrode. The auxiliary electrode is coupled to the second output terminal of the second switch and adjacent to the second pixel electrode.

The invention achieves the above-identified object by providing a LCD device. The LCD device includes a data driver, a scan driver and a LCD panel. The LCD panel includes a scan line, a first data line, a second data line, a first pixel, a second pixel and an auxiliary electrode. The scan line is coupled to the scan driver, and the first and second data lines are coupled to the data driver. The first pixel has a first pixel electrode, a first switch and a second switch. The first switch has a first input terminal, a first control terminal and a first output terminal, wherein the first input terminal is coupled to the first data line, the first control terminal is coupled to the scan line and the first output terminal is coupled to the first pixel electrode. The second switch has a second input terminal, a second control terminal and a second output terminal, wherein the second input terminal is coupled to the first data line, the second control terminal is coupled to the scan line. The second pixel includes a second pixel electrode and a third switch. The third switch has a third input terminal, a third control terminal and a third output terminal, wherein the third input terminal is coupled to the second data line, the third control terminal is coupled to the scan line and the third output terminal is coupled to the second pixel electrode. The auxiliary electrode is coupled to the second output terminal of the second switch and adjacent to the second pixel electrode.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
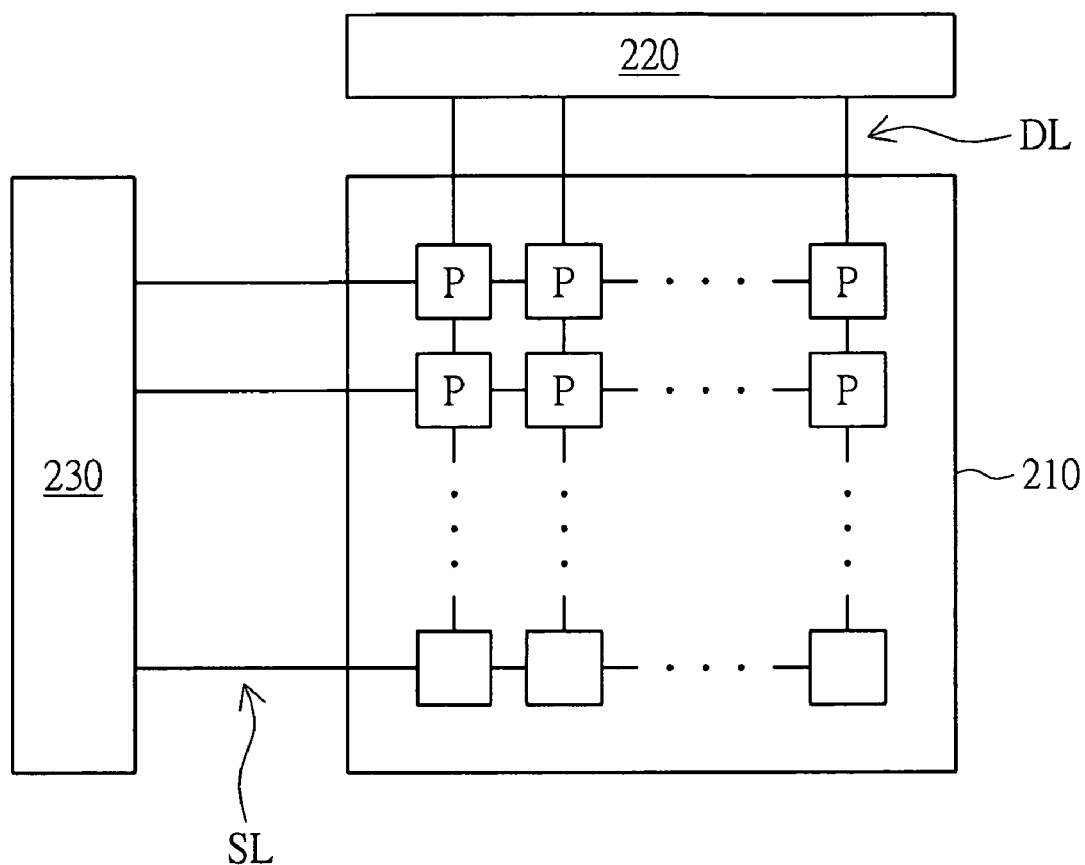
FIG. 1 is a diagram showing a liquid crystal display (LCD) device.

FIG. 1 is a diagram showing a liquid crystal display (LCD) device. The LCD device 20 includes a LCD panel 210, a data driver 220 and a scan driver 230. The LCD panel 210 includes a plurality of pixels P, data lines DL and scan lines SL. The data driver 220 is coupled to the data lines DL and outputs corresponding data signals to the pixels P by the data lines DL. The scan driver 230 is coupled to the scan lines SL and output corresponding scan signals to the pixels P by the scan lines SL so as to actuate each row of the pixels P.

Each pixel P of the LCD panel 210 includes two switches and an auxiliary electrode, wherein one switch is coupled to the pixel electrode of the same pixel and the other switch is coupled to the auxiliary electrode of an adjoining pixel so that the auxiliary electrode has the same pixel voltage as the adjoining pixel. The switches in the pixels P are, for example, thin film transistors (TFT). The input terminal of each switch is, for example, a source electrode coupled to a data line DL. The control terminal of each switch is, for example, a gate electrode coupled to a scan line SL. The output terminal of each switch is, for example, a drain electrode.

In addition, the auxiliary electrode in each pixel P is coupled to an adjoining pixel P in the row or column direction. Embodiments elaborating different pixel structures with auxiliary electrodes are provided in the following.

First Embodiment

Figure 2:
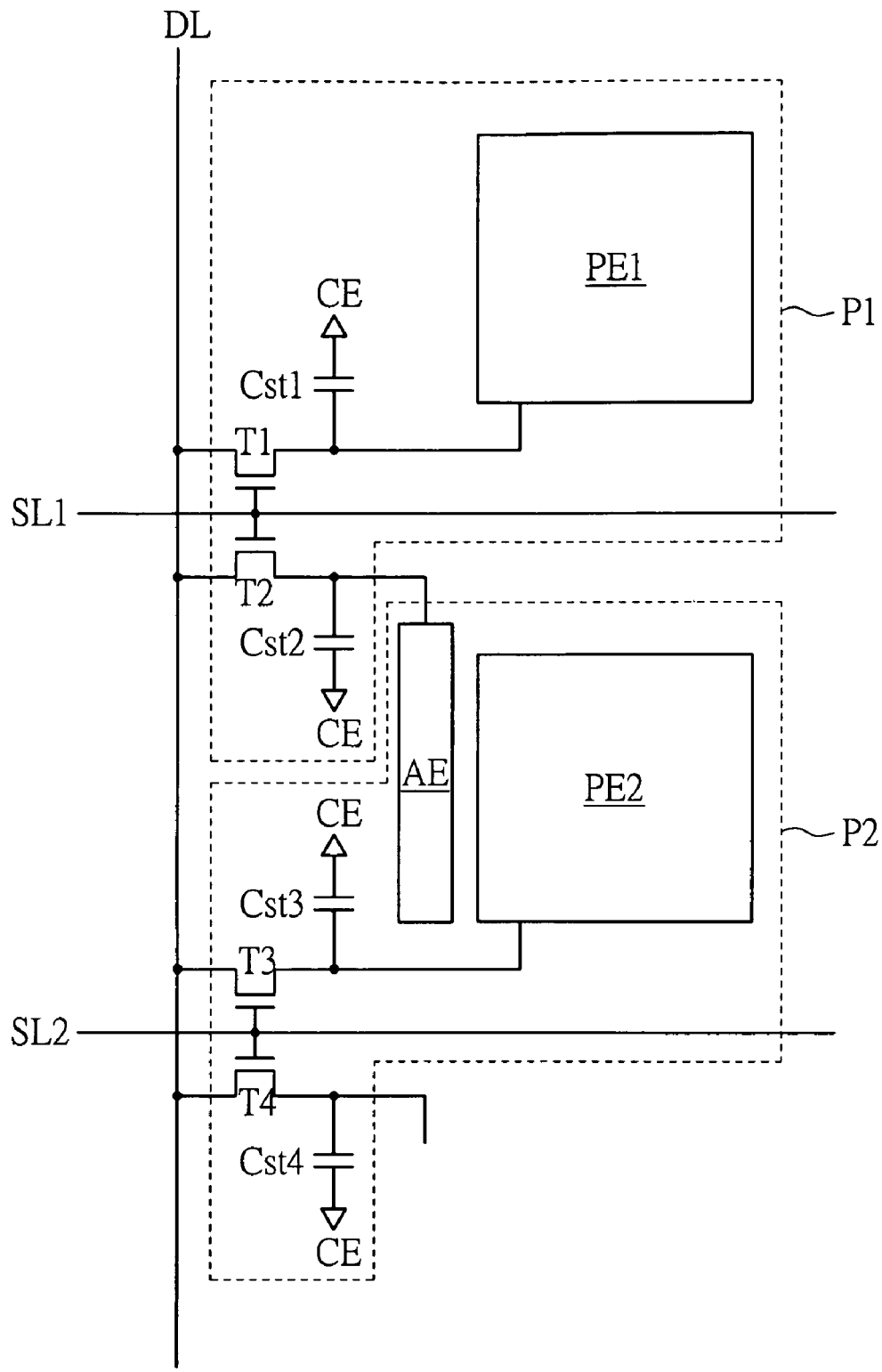
FIG. 2 is an equivalent circuit diagram of a pixel structure according to a first embodiment of the invention.
Figure 3:
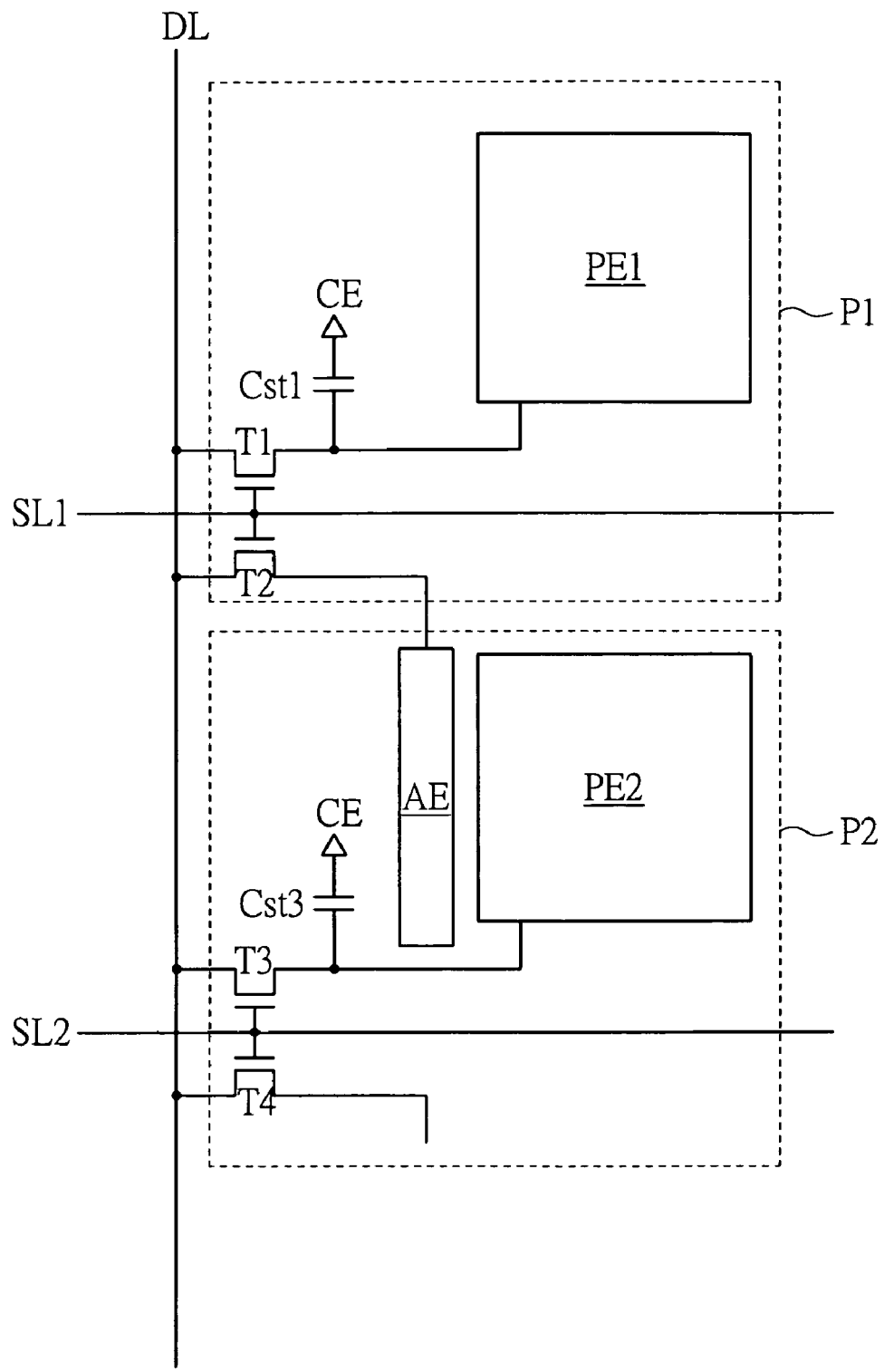
FIG. 3 is an equivalent circuit diagram of the pixel structure in FIG. 2 omitting some storage capacitances.

FIG. 2 is an equivalent circuit diagram of a pixel structure according to a first embodiment of the invention. FIG. 3 is an equivalent circuit diagram of the pixel structure in FIG. 2 omitting some storage capacitances. Two adjoining pixels in the same column direction are taken for illustration in the embodiment. The first pixel includes a first pixel electrode PE1, a first switch T1 and a second switch T2. The first input terminal (source electrode) of the first switch T1 is coupled to the data line DL, the first control terminal (gate electrode) of the first switch T1 is coupled to the first scan line SL1 and the first output terminal (drain electrode) of the first switch T1 is coupled to the first pixel electrode PE1. The second input terminal of the second switch T2 is coupled to the data line DL, the second control terminal of the second switch T2 is coupled to the first scan line SL1.

The second pixel P2 includes a second pixel electrode PE2, a third switch T3 and a fourth switch T4. The third input terminal of the third switch T3 is coupled to the data line DL, the third control terminal of the third switch T3 is coupled to the second scan line SL2 and the third output terminal of the third switch T3 is coupled to the second pixel electrode PE2. The fourth input terminal of the fourth switch T4 is coupled to the data line DL, and the fourth control terminal of the fourth switch T4 is coupled to the second scan line SL2. The auxiliary electrode AE is coupled to the second output terminal of the second switch T2 and adjacent to the second pixel electrode PE2. The fourth output terminal of the fourth switch T4 is coupled to the auxiliary electrode of the next adjoining pixel (not shown in FIG. 2).

In the first pixel P1, a first liquid crystal (LC) capacitance is formed between the first pixel electrode PE1 and the common electrode (not shown in FIG. 2). The first pixel P1 further includes a first storage capacitance Cst1 and a second storage capacitance Cst2, wherein the first storage capacitance Cst1 is coupled to the first switch T1 and the second storage capacitance Cst2 is coupled to the second switch T2 and the auxiliary electrode AE. In the second pixel P2, a second LC capacitance is formed between the second pixel electrode PE2 and the common electrode. The second pixel P2 further includes a third storage capacitance Cst3 and a fourth storage capacitance Cst4, wherein the third storage capacitance Cst3 is coupled to the third switch T3 and the fourth storage capacitance Cst4 is coupled to the fourth switch T4 and the auxiliary electrode of the next adjoining pixel (not shown). The first, second, third and fourth capacitances Cst1 to Cst4 are coupled to the common electrode or to the gate electrodes of the next adjoining pixels. Herein the four capacitances Cst1 to Cst4 are coupled to the common electrode to receive its voltage Vcom (shown in FIG. 4). When actuating the pixels, the second and fourth storage capacitances Cst2 and Cst4 keep providing voltages for the auxiliary electrodes AE (the auxiliary electrode coupled to Cst4 is not shown). In other embodiment, the second and fourth storage capacitances Cst2 and Cst4 can be omitted as shown in FIG. 3.

The auxiliary electrode AE for aligning the LC cells is bar-shaped in the embodiment. However, the auxiliary electrode AE can be formed in other shapes as long as the auxiliary electrode AE is disposed around the pixel electrode. For example, the auxiliary electrode AE can surround the pixel electrode. When manufacturing the first and second pixel electrodes PE1 and PE2, the auxiliary electrode AE adjacent to the second pixel electrode PE2 is formed at the same time and is coupled to the second switch T2 of the first pixel P1. Or, the auxiliary electrode AE can be formed in the process of manufacturing the metal layers of the control terminal (gate electrode), the input terminal (source electrode) and the output terminal (drain electrode), and is, for example, coupled to the second switch T2 of the first pixel P1.

Dot inversion method or line inversion method is employed to actuate each row of pixels so that the first and second pixel electrodes PE1 and PE2 receive pixel voltages of different polarities, and the auxiliary electrode AE coupled to the second switch T2 receives the pixel voltage the same as that of the first pixel electrode PE1. Owing to the adjacency of the auxiliary electrode AE and the second pixel electrode PE2 and their different polarities, the effect of fringe field is generated and causes distortion to the electric field, so as to control the tilt of the LC cells. The second pixel P2 therefore has the effect of multi-domain in displaying image.

Figure 4:
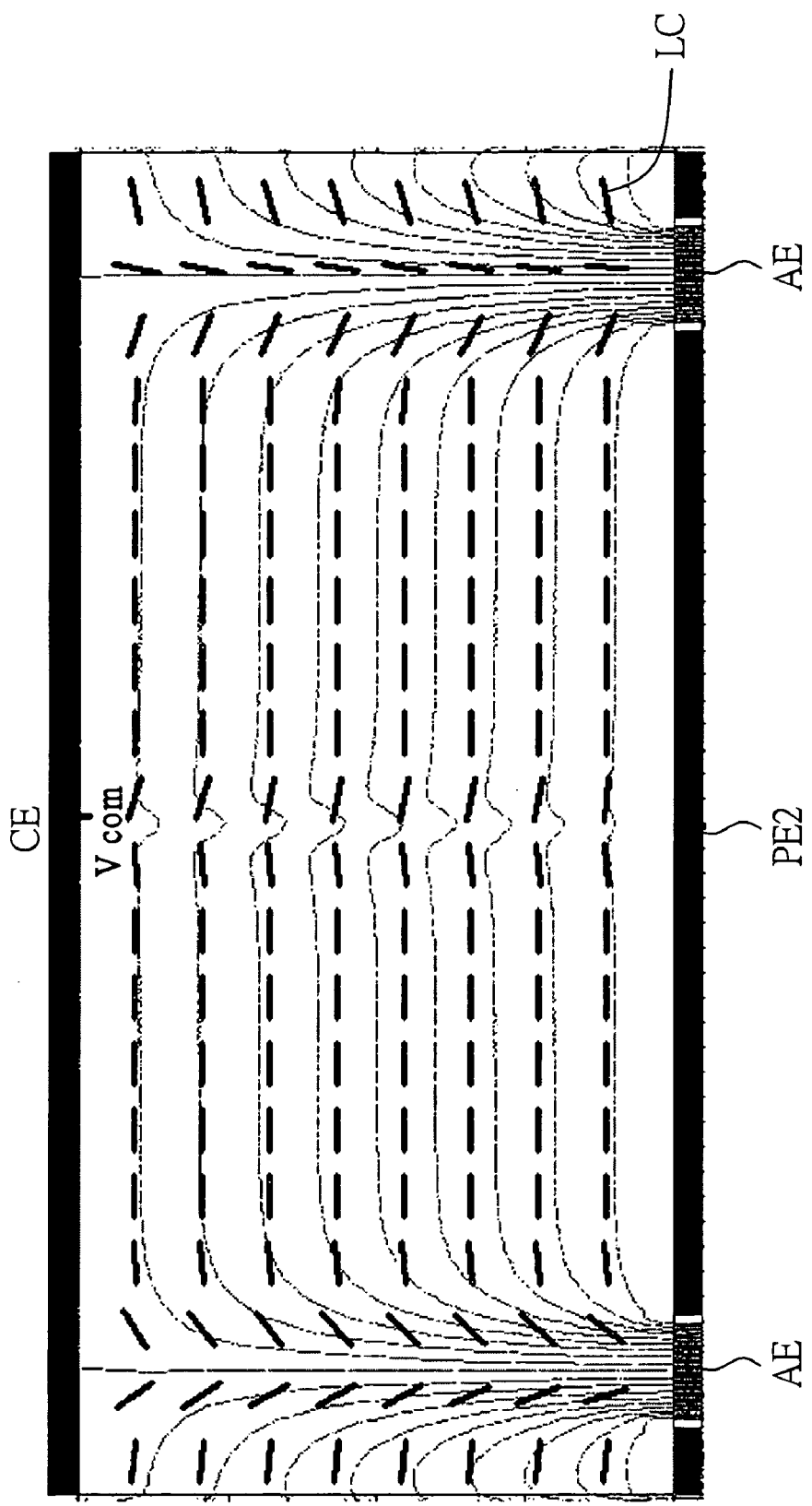
FIG. 4 is a distribution diagram of the electric field when providing pixel voltages of different polarities for the auxiliary electrode and the second pixel electrode.

FIG. 4 is a distribution diagram of the electric field when providing pixel voltages of different polarities for the auxiliary electrode and the second pixel electrode. In FIG. 4, the auxiliary electrode AE is disposed on two sides of the second pixel electrode PE2. The pixel voltage applied to the auxiliary electrode AE is from the first pixel electrode PE1 and its polarity differs from the second pixel electrode PE2, the effect of fringe field is thus generated. Due to the distortion of the electric field, the LC cells have a tendency to tilt toward the central of the pixel. As such, the LCD panel 210 has the advantage of wide viewing angle to present at least two display domains. As the auxiliary electrode AE coupled to the first pixel electrode PE1 is disposed surrounding the four sides of the second pixel electrode PE2 and the dot or line inversion method is used, the LC cells tilt toward the center of the pixel from four different directions due to the effect of fringe field, enabling the LCD panel 210 to have four display domains for a wide viewing angle.

A coupling capacitance is formed between the auxiliary electrode AE and the second pixel electrode PE2. When the pixel voltage of the second pixel electrode PE2 is changed, the voltage of the auxiliary electrode AE is affected because of the coupling capacitance effect. It should be noted that the auxiliary electrode AE is not directly connected to the pixel electrode PE1 of the first pixel P1. When the voltage of the auxiliary electrode AE is changed with the pixel voltage of the second pixel electrode PE2, the voltage shift of the auxiliary electrode AE does not influence the pixel voltage of the first pixel electrode PE1 since the second switch T2 is turned off. That is, regardless of the coupling capacitance effect generated in the second pixel P2, the problem of pixel voltage shift does not occur in the first pixel P1. Therefore, failure of images due to the pixel voltage shift is avoided accordingly.

As shown in FIGS. 2 and 3, the second and fourth switches T2 and T4 are directly connected to the data line DL. However, the second and fourth switches T2 and T4 can be coupled to the data line DL by the first and third switches T1 and T3.

Figure 5:
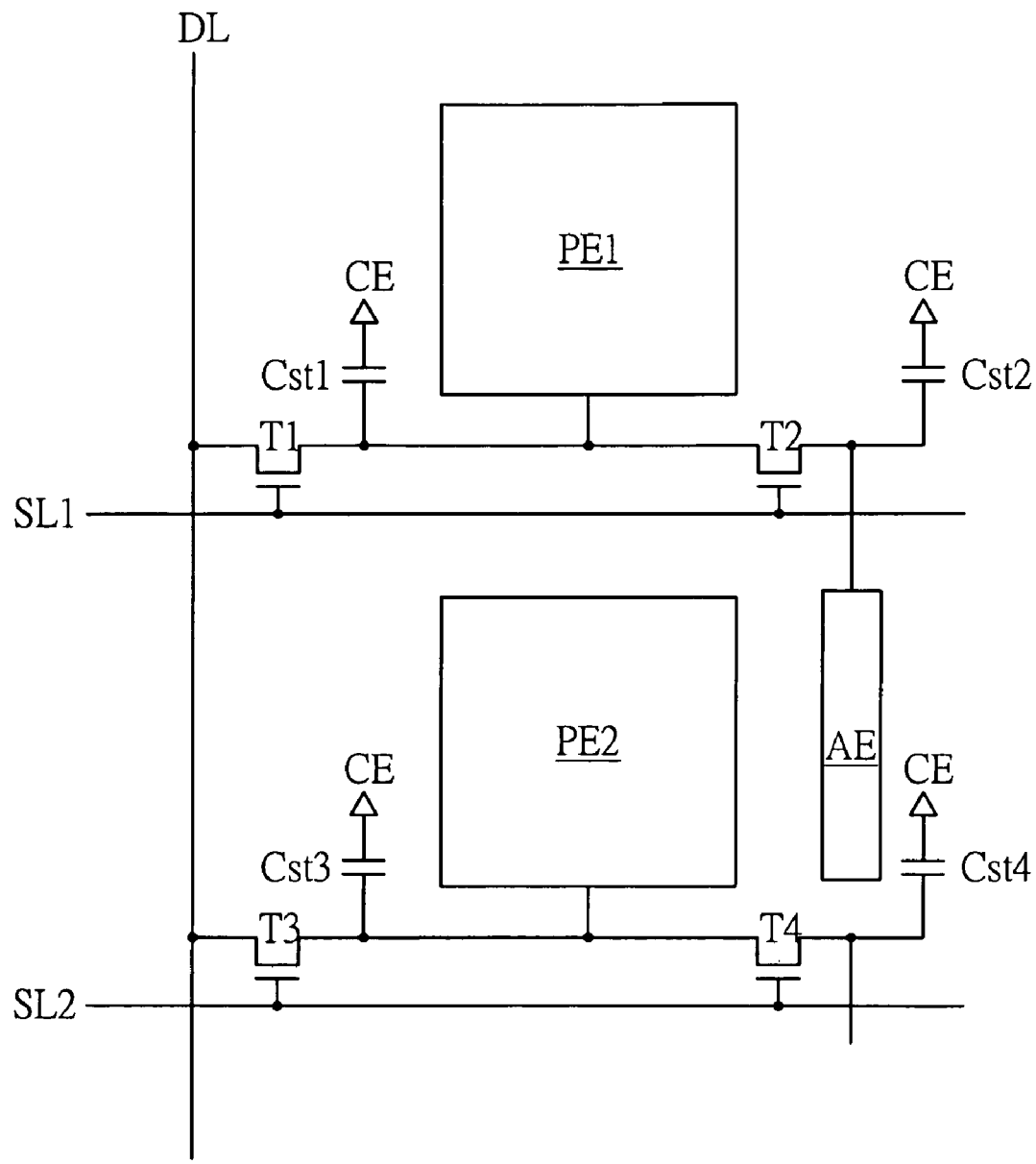
FIG. 5 is an equivalent circuit diagram showing the second (fourth) switch coupled to the data line by the first (third) switch.
Figure 6:
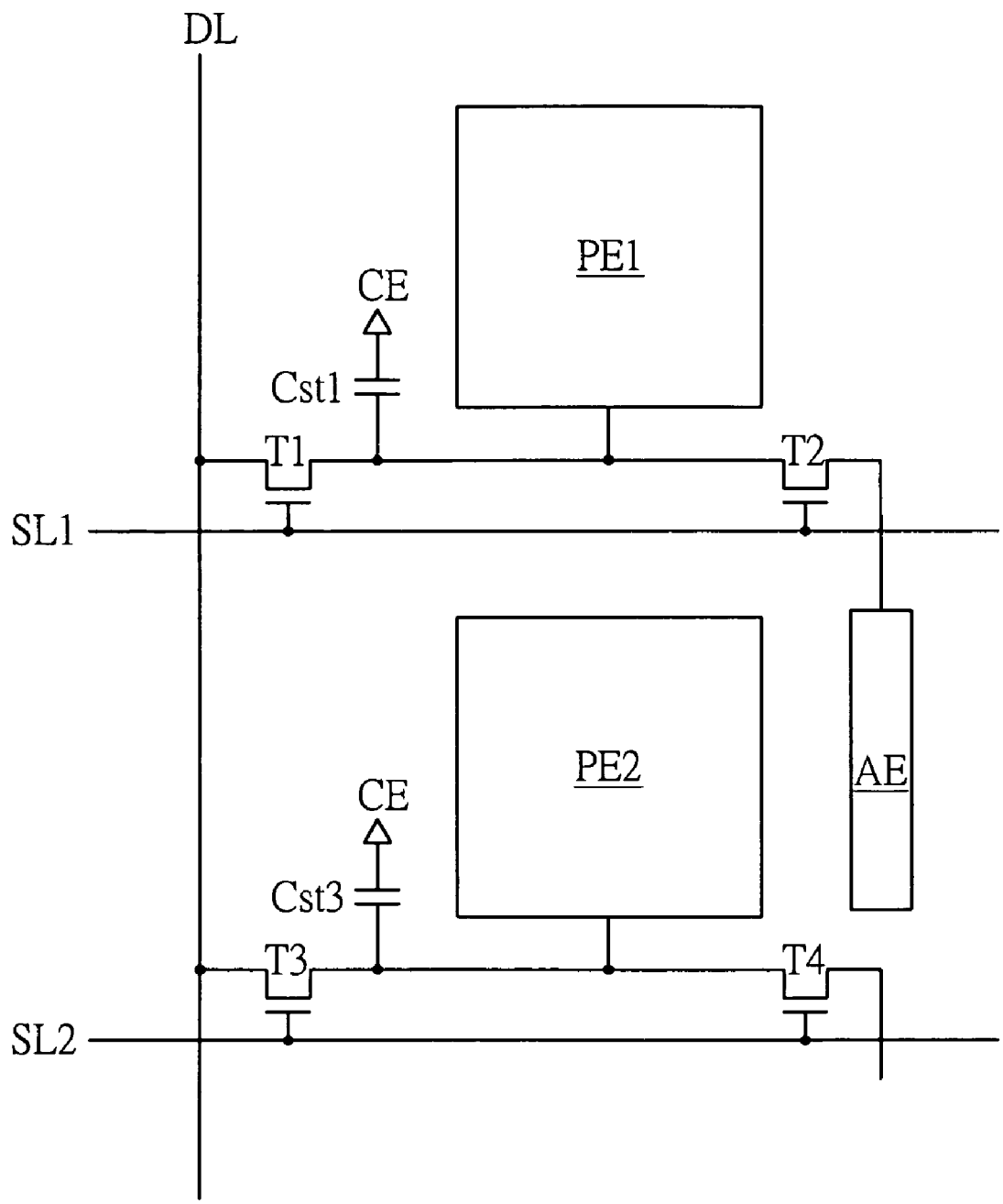
FIG. 6 is an equivalent circuit diagram of the pixel structure in FIG. 5 omitting some storage capacitances.

FIG. 5 is an equivalent circuit diagram showing the second (fourth) switch coupled to the data line by the first (third) switch. FIG. 6 is an equivalent circuit diagram of the pixel structure in FIG. 5 omitting some storage capacitances. As shown in FIG. 5, the second input terminal of the second switch T2 is coupled to the data line DL by the first switch T1, and the fourth input terminal of the fourth switch T4 is coupled to the data line DL by the third switch T3. In addition, the second and fourth storage capacitances Cst2 and Cst4 can be omitted, as shown in FIG. 6.

Figure 7:
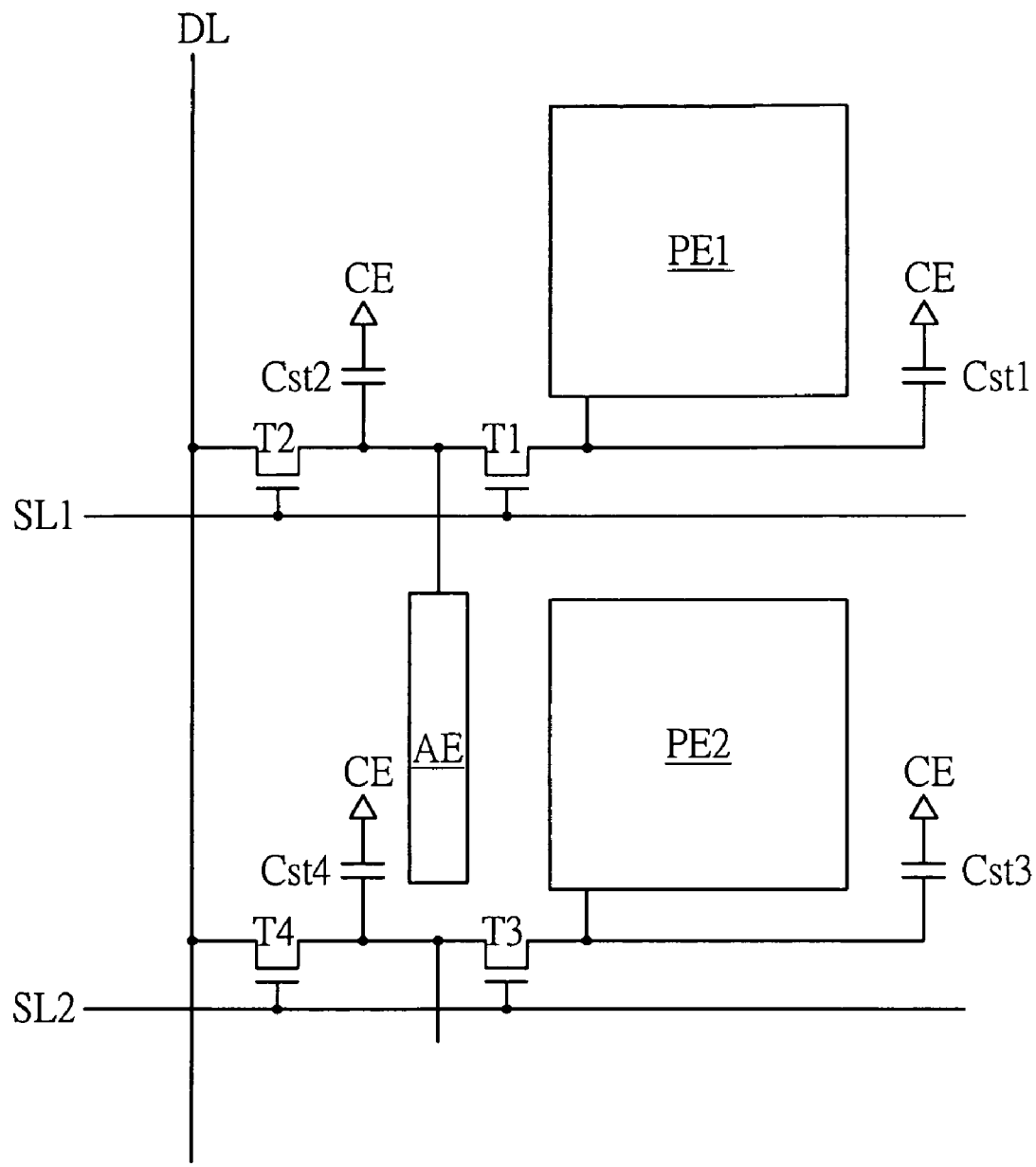
FIG. 7 is an equivalent circuit diagram showing the first (third) switch coupled to the data line by the second (fourth) switch.
Figure 8:
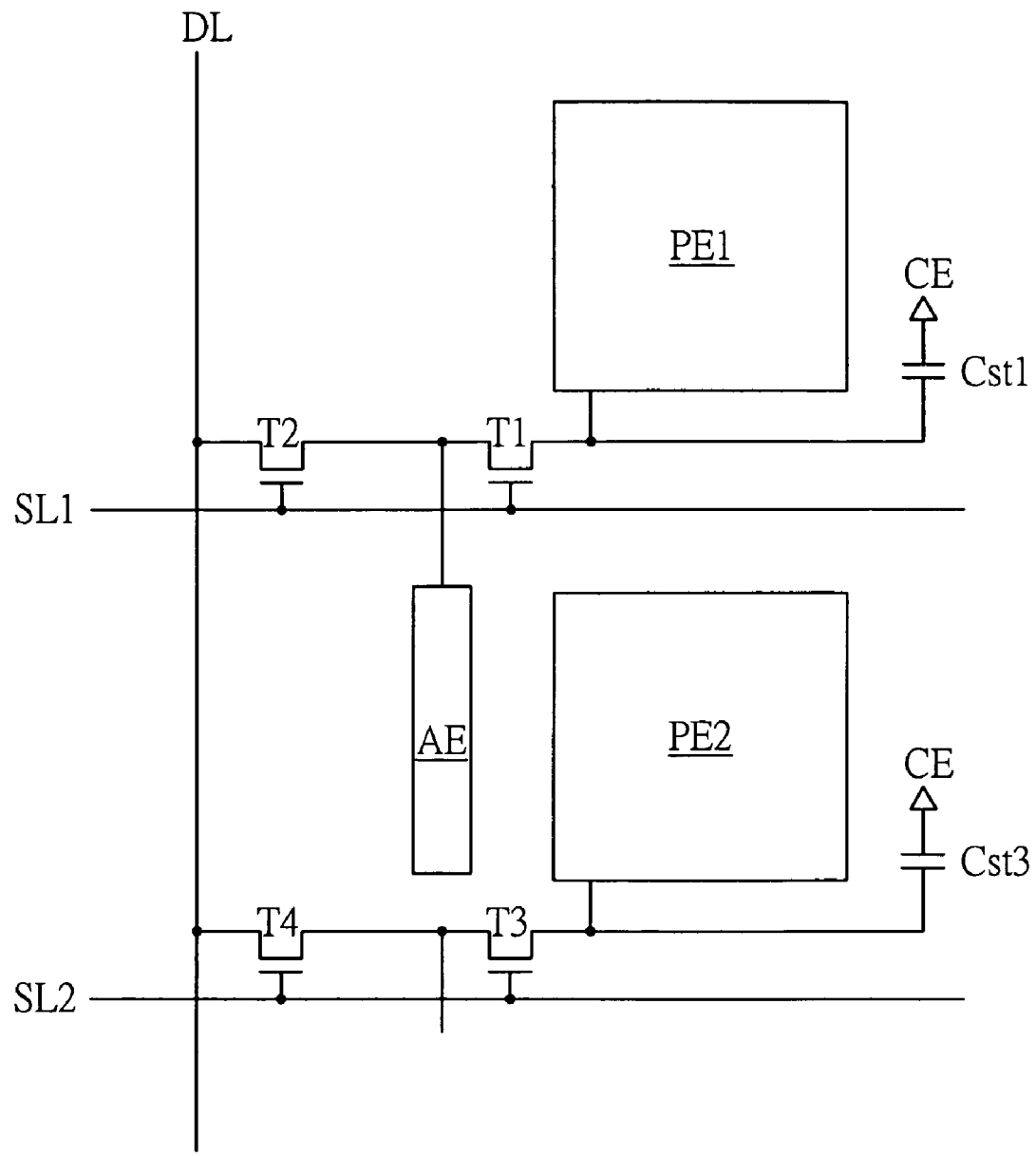
FIG. 8 is an equivalent circuit diagram of the pixel structure in FIG. 7 omitting some storage capacitances.

The first and third switches T1 and T3 can be coupled to the data line DL by the second and fourth switches T2 and T4. FIG. 7 is an equivalent circuit diagram showing the first (third) switch coupled to the data line by the second (fourth) switch. FIG. 8 is an equivalent circuit diagram of the pixel structure in FIG. 7 omitting some storage capacitances. As shown in FIG. 7, the first input terminal of the first switch T1 is coupled to the data line DL by the second switch T1, and the third input terminal of the third switch T3 is coupled to the data line DL by the fourth switch T4. Moreover, as shown in FIG. 6, the second and fourth storage capacitances Cst2 and Cst4 can be omitted.

Second Embodiment

In the embodiment, pixel structure having two adjoining pixels in the same row direction is taken for illustration, which is different from the first embodiment.

Figure 9:
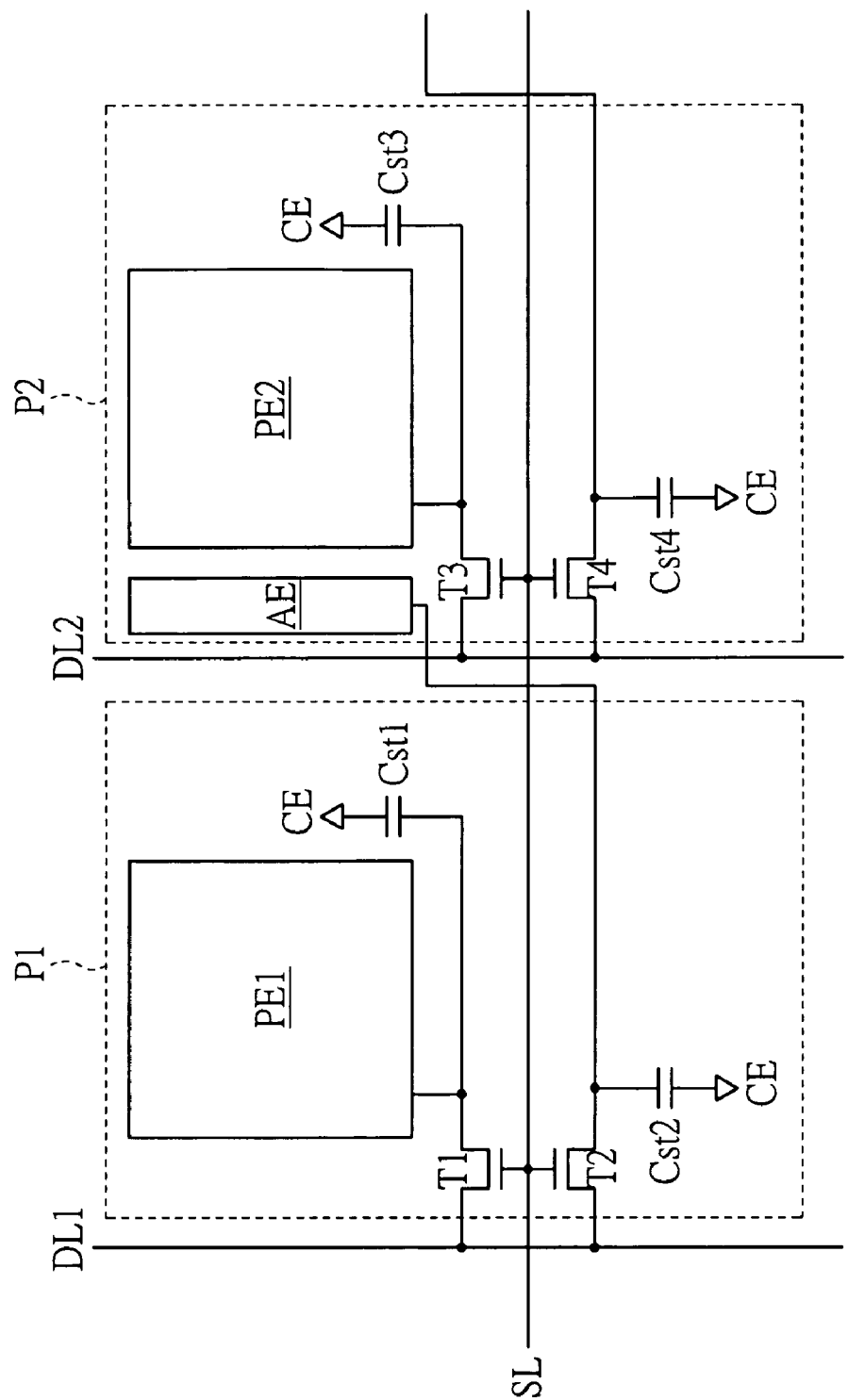
FIG. 9 is an equivalent circuit diagram of the pixel structure according to a second embodiment of the invention.
Figure 10:
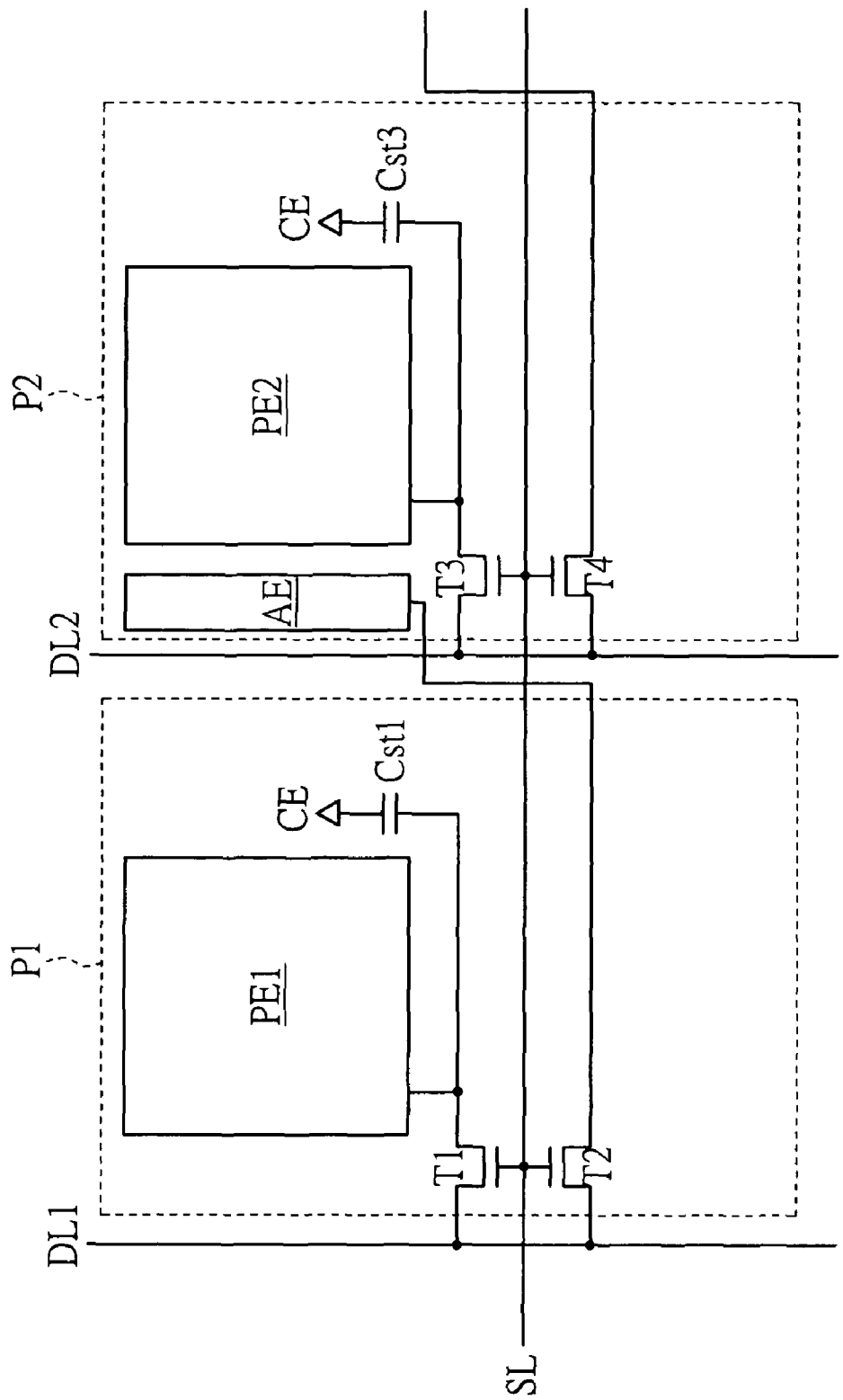
FIG. 10 is an equivalent circuit diagram of the pixel structure in FIG. 9 omitting some storage capacitances.

FIG. 9 is an equivalent circuit diagram of the pixel structure according to a second embodiment of the invention. FIG. 10 is an equivalent circuit diagram of the pixel structure in FIG. 9 omitting some storage capacitances. As shown in FIG. 9, a first pixel P1 is adjacent to a second pixel P2 in the row direction. The first pixel P1 includes a first pixel electrode PE1, a first switch T1 and a second switch T2. The first switch T1 has a first input terminal, a first control terminal and a first output terminal, wherein the first input terminal is coupled to the first data line DL1, the first control terminal is coupled to the scan line SL and the first output terminal is coupled to the first pixel electrode PE1. The second switch T2 has a second input terminal, a second control terminal and a second output terminal, wherein the second input terminal is coupled to the first data line DL1, and the second control terminal is coupled to the scan line SL.

The second pixel P2 includes a second pixel electrode PE2, a third switch T3 and a fourth switch T4. The third switch T3 has a third input terminal, a third control terminal and a third output terminal, wherein the third input terminal is coupled to the second data line DL2, the third control terminal is coupled to the scan line SL and the third output terminal is coupled to the second pixel electrode PE2. An auxiliary electrode AE is coupled to the second output terminal of the second switch T2 and adjacent to the second pixel electrode PE2. The fourth switch T4 has a fourth control terminal and a fourth output terminal, wherein the fourth control terminal is coupled to the scan line SL and the fourth output terminal is coupled to the auxiliary electrode of the next adjoining pixel (not shown in FIG. 9) in the row direction.

In the first pixel P1, a first liquid crystal (LC) capacitance is formed between the first pixel electrode PE1 and the common electrode (not shown in FIG. 9). The first storage capacitance Cst1 and the LC capacitance are used for displaying the first pixel P1. A second LC capacitance, which is formed between the second pixel electrode PE2 and the common electrode, and the third storage capacitance Cst3 are used for displaying the second pixel P2. When actuating the pixels P1 and P2, the second and fourth storage capacitances Cst2 and Cst4 keep providing voltage for the auxiliary electrodes AE (the one coupled to Cst4 is not shown). In other embodiment, the second and fourth storage capacitances Cst2 and Cst4 can be omitted as shown in FIG. 10.

Dot inversion or line inversion method is used for actuating each row of pixels, so that the first and second pixel electrodes PE1 and PE2 receive pixel voltages of different polarities, and the auxiliary electrode AE coupled to the second switch T2 receives the pixel voltage the same as that of the first pixel electrode PE1. The auxiliary electrode AE is adjacent to the second pixel electrode PE2 and has different polarity, the effect of fringe field is generated, causing distortion to the electric field and controlling the tilt of the LC cells. Therefore, the second pixel P2 has the effect of multi-domain in displaying image.

The effect of coupling capacitance is produced between the auxiliary electrode AE and the second pixel electrode PE2. When the pixel voltage of the second pixel electrode PE2 is changed, the voltage of the auxiliary electrode AE is affected because of the coupling capacitance. It should be noted that the auxiliary electrode AE is not directly connected to the pixel electrode PE1 of the first pixel P1. When the voltage of the auxiliary electrode AE is changed with the pixel voltage of the second pixel electrode PE2, the voltage shift of the auxiliary electrode AE does not influence the pixel voltage of the first pixel electrode PE1 since the second switch T2 is already turned off. That is, regardless of the coupling capacitance in the second pixel P2, the problem of pixel voltage shift does not occur in the first pixel P1 and the failure of images due to the pixel voltage shift is avoided accordingly.

As shown in FIGS. 9 and 10, the second and fourth switches T2 and T4 are directly connected to the first and second data lines DL1 and DL2. However, the second and fourth switches T2 and T4 can be coupled to the first and second data lines DL1 and DL2 by the first and third switches T1 and T3. In addition, the second and fourth storage capacitances Cst2 and Cst4 can be omitted in the pixel structures.

The LCD panel and the LCD device using the same disclosed in the above embodiments have an auxiliary electrode for aligning LC cells in each pixel. The auxiliary electrode is adjacent to at least one side of the pixel electrode, or is disposed surrounding the pixel electrode. And the auxiliary electrode is coupled to the switch of an adjoining pixel. When actuating the pixels, the auxiliary electrode and pixel electrode in each pixel generate an effect of fridge field to control the tilt of the LC cells. Since the auxiliary electrode is not connected to the switch that is coupled to the pixel electrode of the adjoining pixel, the effect of coupling capacitance between the auxiliary electrode and the pixel electrode does not affect the pixel voltage of the adjoining pixel, solving the conventional problem of pixel voltage shift.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display (LCD) panel comprising:
a data line;
a first scan line and a second scan line;
a first pixel having:
a first pixel electrode;
a first switch having a first input terminal, a first control terminal and a first output terminal, wherein the first input terminal is coupled to the data line, the first control terminal is coupled to the first scan line and the first output terminal is coupled to the first pixel electrode; and
a second switch having a second input terminal, a second control terminal and a second output terminal, wherein the second input terminal is coupled to the data line, the second control terminal is coupled to the first scan line;
a second pixel having
a second pixel electrode; and
a third switch having a third input terminal, a third control terminal and a third output terminal, wherein the third input terminal is coupled to the data line, the third control terminal is coupled to the second scan line and the third output terminal is coupled to the second pixel electrode; and
an auxiliary electrode coupled to the second output terminal of the second switch and adjacent to the second pixel electrode,
wherein the second input terminal of the second switch is coupled to the data line via the first switch.

2. The LCD panel according to claim 1, wherein the first pixel electrode and the second electrode receive different polarity voltages to have different polarities, so that the second pixel produces a plurality of display domains.

3. The LCD panel according to claim 1, wherein the second pixel further has a fourth switch, the fourth switch has a fourth input terminal, a fourth control terminal and a fourth output terminal, the fourth input terminal is coupled to the data line, and the fourth control terminal is coupled to the second scan line.

4. The LCD panel according to claim 3, wherein the first, second, third and fourth switches are thin film transistors.

5. A liquid crystal display (LCD) panel comprising:
a data line:
a first scan line and a second scan line;
a first pixel having:
a first pixel electrode;
a first switch having a first input terminal, a first control terminal and a first output terminal, wherein the first input terminal is coupled to the data line, the first control terminal is coupled to the first scan line and the first output terminal is coupled to the first pixel electrode; and
a second switch having a second input terminal, a second control terminal and a second output terminal, wherein the second input terminal is coupled to the data line, the second control terminal is coupled to the first scan line;
a second pixel having
a second pixel electrode; and
a third switch having a third input terminal, a third control terminal and a third output terminal, wherein the third input terminal is coupled to the data line, the third control terminal is coupled to the second scan line and the third output terminal is coupled to the second pixel electrode; and
an auxiliary electrode coupled to the second output terminal of the second switch and adjacent to the second pixel electrode,
wherein the first input terminal of the first switch is coupled to the data line via the second switch.

6. The LCD panel according to claim 5, wherein the first pixel electrode and the second electrode receive different polarity voltages to have different polarities, so that the second pixel produces a plurality of display domains.

7. The LCD panel according to claim 5, wherein the second pixel further has a fourth switch, the fourth switch has a fourth input terminal, a fourth control terminal and a fourth output terminal, the fourth input terminal is coupled to the data line, and the fourth control terminal is coupled to the second scan line.

8. The LCD panel according to claim 7, wherein the first, second, third and fourth switches are thin film transistors.

9. A LCD panel comprising:
a scan line;
a first data line and a second data line;
a first pixel having
a first pixel electrode;
a first switch having a first input terminal, a first control terminal and a first output terminal, wherein the first input terminal is coupled to the first data line, the first control terminal is coupled to the scan line and the first output terminal is coupled to the first pixel electrode; and a second switch having a second input terminal, a second control terminal and a second output terminal, wherein the second input terminal is coupled to the first data line, the second control terminal is coupled to the scan line;

a second pixel having a second pixel electrode; and a third switch having a third input terminal, a third control terminal and a third output terminal, wherein the third input terminal is coupled to the second data line, the third control terminal is coupled to the scan line and the third output terminal is coupled to the second pixel electrode; and an auxiliary electrode coupled to the second output terminal of the second switch and adjacent to the second pixel electrode, wherein the second input terminal of the second switch is coupled to the first data line via the first switch.

10. The LCD panel according to claim 9, wherein the first pixel electrode and the second electrode receive different polarity voltages to have different polarities, so that the second pixel produces a plurality of display domains.

11. The LCD panel according to claim 9, wherein the second pixel further has a fourth switch, the fourth switch has a fourth input terminal, a fourth control terminal and a fourth output terminal, the fourth input terminal is coupled to the second data line, and the fourth control terminal is coupled to the scan line.

12. The LCD panel according to claim 11, wherein the first, second, third and fourth switches are thin film transistors.

13. A LCD panel comprising:

a scan line;

a first data line and a second data line;

a first pixel having a first pixel electrode;

a first switch having a first input terminal, a first control terminal and a first output terminal, wherein the first input terminal is coupled to the first data line, the first control terminal is coupled to the scan line and the first output terminal is coupled to the first pixel electrode; and a second switch having a second input terminal, a second control terminal and a second output terminal, wherein the second input terminal is coupled to the first data line, the second control terminal is coupled to the scan line;

a second pixel having a second pixel electrode; and a third switch having a third input terminal, a third control terminal and a third output terminal, wherein the third input terminal is coupled to the second data line, the third control terminal is coupled to the scan line and the third output terminal is coupled to the second pixel electrode; and an auxiliary electrode coupled to the second output terminal of the second switch and adjacent to the second pixel electrode, wherein the first input terminal of the first switch is coupled to the first data line via the second switch.

14. The LCD panel according to claim 13, wherein the first pixel electrode and the second electrode receive different polarity voltages to have different polarities, so that the second pixel produces a plurality of display domains.

15. The LCD panel according to claim 13, wherein the second pixel further has a fourth switch, the fourth switch has a fourth input terminal, a fourth control terminal and a fourth output terminal, the fourth input terminal is coupled to the second data line, and the fourth control terminal is coupled to the scan line.

16. The LCD panel according to claim 15, wherein the first, second, third and fourth switches are thin film transistors.

17. A LCD device comprising:

a data driver;

a scan driver; and a LCD panel having a data line coupled to the data driver;

a first scan line and a second scan line both coupled to the scan driver;

a first pixel having a first pixel electrode;

a first switch having a first input terminal, a first control terminal and a first output terminal, wherein the first input terminal is coupled to the data line, the first control terminal is coupled to the first scan line and the first output terminal is coupled to the first pixel electrode; and a second switch having a second input terminal, a second control terminal and a second output terminal, wherein the second input terminal is coupled to the data line, the second control terminal is coupled to the first scan line;

a second pixel having a second pixel electrode; and a third switch having a third input terminal, a third control terminal and a third output terminal, wherein the third input terminal is coupled to the data line, the third control terminal is coupled to the second scan line and the third output terminal is coupled to the second pixel electrode; and an auxiliary electrode coupled to the second output terminal of the second switch and adjacent to the second pixel electrode, wherein the second input terminal of the second switch is coupled to the data line via the first switch.

18. The LCD device according to claim 17, wherein the first pixel electrode and the second electrode receive different polarity voltages to have different polarities, so that the second pixel produces a plurality of display domains.

19. The LCD device according to claim 17, wherein the second pixel further has a fourth switch, the fourth switch has a fourth input terminal, a fourth control terminal and a fourth output terminal, the fourth input terminal is coupled to the data line, and the fourth control terminal is coupled to the second scan line.

20. The LCD device according to claim 19, wherein the first, second, third and fourth switches are thin film transistors.

21. A LCD device comprising:

a data driver;

a scan driver; and a LCD panel having a data line coupled to the data driver;

a first scan line and a second scan line both coupled to the scan driver;

a first pixel having a first pixel electrode;

a first switch having a first input terminal, a first control terminal and a first output terminal, wherein the first input terminal is coupled to the data line, the first control terminal is coupled to the first scan line and the first output terminal is coupled to the first pixel electrode; and a second switch having a second input terminal, a second control terminal and a second output terminal, wherein the second input terminal is coupled to the data line, the second control terminal is coupled to the first scan line;

a second pixel having
a second pixel electrode; and
a third switch having a third input terminal, a third control terminal and a third output terminal, wherein the third input terminal is coupled to the data line, the third control terminal is coupled to the second scan line and the third output terminal is coupled to the second pixel electrode; and
an auxiliary electrode coupled to the second output terminal of the second switch and adjacent to the second pixel electrode,
wherein the first input terminal of the first switch is coupled to the data line via the second switch.

22. The LCD device according to claim 21, wherein the first pixel electrode and the second electrode receive different polarity voltages to have different polarities, so that the second pixel produces a plurality of display domains.

23. The LCD device according to claim 21, wherein the second pixel further has a fourth switch, the fourth switch has a fourth input terminal, a fourth control terminal and a fourth output terminal, the fourth input terminal is coupled to the data line, and the fourth control terminal is coupled to the second scan line.

24. The LCD device according to claim 23, wherein the first, second, third and fourth switches are thin film transistors.

25. A LCD device comprising:
a data driver;
a scan driver; and
a LCD panel having
a scan line coupled to the scan driver;
a first data line and a second data line both coupled to the data driver;
a first pixel having
a first pixel electrode;
a first switch having a first input terminal, a first control terminal and a first output terminal, wherein the first input terminal is coupled to the first data line, the first control terminal is coupled to the scan line and the first output terminal is coupled to the first pixel electrode; and
a second switch having a second input terminal, a second control terminal and a second output terminal, wherein the second input terminal is coupled to the first data line, the second control terminal is coupled to the scan line;
a second pixel having
a second pixel electrode; and
a third switch having a third input terminal, a third control terminal and a third output terminal, wherein the third input terminal is coupled to the second data line, the third control terminal is coupled to the scan line and the third output terminal is coupled to the second pixel electrode; and
an auxiliary electrode coupled to the second output terminal of the second switch and adjacent to the second pixel electrode,
wherein the second input terminal of the second switch is coupled to the first data line via the first switch.

26. The LCD device according to claim 25, wherein the first pixel electrode and the second electrode receive different polarity voltages to have different polarities, so that the second pixel produces a plurality of display domains.

27. The LCD device according to claim 25, wherein the second pixel further has a fourth switch, the fourth switch has a fourth input terminal, a fourth control terminal and a fourth output terminal, the fourth input terminal is coupled to the second data line, and the fourth control terminal is coupled to the scan line.

28. The LCD device according to claim 27, wherein the first, second, third and fourth switches are thin film transistors.

29. A LCD device comprising:
a data driver;
a scan driver; and
a LCD panel having
a scan line coupled to the scan driver;
a first data line and a second data line both coupled to the data driver;
a first pixel having
a first pixel electrode;
a first switch having a first input terminal, a first control terminal and a first output terminal, wherein the first input terminal is coupled to the first data line, the first control terminal is coupled to the scan line and the first output terminal is coupled to the first pixel electrode; and
a second switch having a second input terminal, a second control terminal and a second output terminal, wherein the second input terminal is coupled to the first data line, the second control terminal is coupled to the scan line;
a second pixel having
a second pixel electrode; and
a third switch having a third input terminal, a third control terminal and a third output terminal, wherein the third input terminal is coupled to the second data line, the third control terminal is coupled to the scan line and the third output terminal is coupled to the second pixel electrode; and
an auxiliary electrode coupled to the second output terminal of the second switch and adjacent to the second pixel electrode,
wherein the first input terminal of the first switch is coupled to the first data line via the second switch.

30. The LCD device according to claim 29, wherein the first pixel electrode and the second electrode receive different polarity voltages to have different polarities, so that the second pixel produces a plurality of display domains.

31. The LCD device according to claim 29, wherein the second pixel further has a fourth switch, the fourth switch has a fourth input terminal, a fourth control terminal and a fourth output terminal, the fourth input terminal is coupled to the second data line, and the fourth control terminal is coupled to the scan line.

32. The LCD device according to claim 31, wherein the first, second, third and fourth switches are thin film transistors.

* * * * *